United States Patent
Velez et al.

[19]

[11] Patent Number: 6,137,841
[45] Date of Patent: Oct. 24, 2000

[54] SIGNAL POWER ADJUSTMENT FOR QAM COMMUNICATION SYSTEMS

[75] Inventors: Edgar Velez, Kanata; Michel Darveau, Aylmer, both of Canada

[73] Assignee: Nortel Networks Corporation, Montreal, Canada

[21] Appl. No.: 09/071,346

[22] Filed: May 1, 1998

[51] Int. Cl.$^7$ .................................................. H04L 27/36
[52] U.S. Cl. ........................................... 375/298; 455/522
[58] Field of Search ................................... 375/298, 297; 455/522, 69, 116

[56] References Cited

U.S. PATENT DOCUMENTS

| | | | |
|---|---|---|---|
| 4,991,164 | 2/1991 | Casiraghi et al. | 370/17 |
| 5,381,449 | 1/1995 | Jasper et al. | 375/59 |
| 5,606,578 | 2/1997 | O'Dea | 375/298 |
| 5,621,762 | 4/1997 | Miller et al. | 375/398 |
| 5,982,766 | 11/1999 | Nystrom et al. | 370/347 |
| 6,067,458 | 5/2000 | Chen | 455/522 |

*Primary Examiner*—Stephen Chin
*Assistant Examiner*—Mohammad Ghayour
*Attorney, Agent, or Firm*—Max R. Wood

[57] ABSTRACT

The invention provides a method and apparatus for scaling transmitter power to a prescribed level (e.g. at or below the maximum average transmitter power supported by the communication system) for a full range of QAM index levels. In particular, in an n-level quadrature amplitude modulation (QAM) communication system having a digital-to-analog converter and an n-QAM signal having an average transmitter power, for transmission on a communication channel, the method of adjusting the average transmitter power of the signal includes selecting a reference QAM index from a prescribed set of QAM index levels (e.g. 4, 16, 64, 256) where the composite signal is processed with a maximum average transmitter power supported by the communication system. The next step involves generating a power adjustment coefficient for each of the QAM index levels from the prescribed set of QAM index levels based on the reference QAM index level. The final step involves adjusting the average transmitter power of the n-QAM signal with the corresponding power adjustment coefficient for the n-QAM signal to scale the average transmitter power to the prescribed maximum average transmitter power.

26 Claims, 2 Drawing Sheets

SIGNAL POWER ADJUSTMENT FOR QAM COMMUNICATION SYSTEMS

FIELD OF THE INVENTION

This invention relates to the field of n-level QAM communication systems and in particular to a method and apparatus for adjusting signal transmitter power to a prescribed operable power for a full range of QAM index levels.

BACKGROUND OF THE INVENTION

In communication systems a modem is used to convert (modulate) digital signals generated by a computer into analog signals suitable for transmission over telephone lines. Another modem, located at the receiving end of the transmission, converts (demodulates) the analog signals back into digital form. Typically, the communication path used by such systems has various limitations, such as bandwidth. As a result, there are upper practical limitations that restrict the quantity of information that can be supported by the communication path over a given period of time. Various modulation schemes have been proposed that effectively increase the information handling capacity of the communication path as measured against other modulation techniques. For example, sixteen-point quadrature amplitude modulation (16-QAM) provides a constellation of modulation values that are distinguished from one another by each having a different combination of phase and amplitude, where each constellation point represents a plurality of information bits.

Due to the changing amplitude from QAM-symbol time to QAM-symbol time, QAM symbols in a QAM communication system require linear amplification to be able to accurately distinguish one QAM symbol at one amplitude level and another QAM symbol at some other amplitude level.

In QAM communications systems, both the average power and the peak to average power ratio (referred to as peak to RMS power ratio) change for different QAM indexes. In particular, the average power and the peak to RMS power ratio is small for low QAM indexes (4, 16-QAM) and higher for large QAM indexes (64, 256-QAM). The difference in average power can cause a deviation of over 1 db in transmitter power, which could lead to exceeding transmission power spectral density levels for a high QAM index (e.g. for 64, 256-QAM) or transmitting too little power for a lower QAM index (e.g. for 4, 16-QAM).

In the prior art, QAM communication systems with high indexes have generally ignored small power level differences due to different average power levels. However, this is unacceptable in QAM systems that must operate in a range from 4-QAM up to 256-QAM and higher. The difference in transmitter power level between 4-QAM and the higher indexes is quite significant and would cause too little power to be transmitted with 4-QAM if left uncompensated thereby unnecessarily reducing transmission reach over an asynchronous digital subscriber line (ADSL), for example.

SUMMARY OF THE INVENTION

An object of the present invention is to provide a system and method for adjusting transmitter power to a prescribed operable power for a full range of QAM index levels in QAM communication systems.

In accordance with an aspect of the present invention there is provided in a quadrature amplitude modulation (QAM) communication system comprised of a composite n-QAM signal, where n is a QAM index level, having an average power, for transmission on a communication channel supporting a prescribed maximum average power, a method of adjusting the average power in said composite signal to the prescribed maximum average power, said method comprising the steps of: (a) generating a power adjustment coefficient based on the QAM index level n; and (b) adjusting the average power of the composite n-QAM signal with the power adjustment coefficient to scale the average power to the prescribed maximum average power.

In accordance with another aspect of the present invention there is provided in a quadrature amplitude modulation (QAM) communication system for transmitting an n-QAM signal, having an average power, on a communication channel, where n is a QAM index level, a method of scaling the average power in said signal, said method comprising the steps of: (a) generating a power adjustment coefficient associated based on the QAM index level n; and (b) scaling the average power of the signal with the power adjustment coefficient, such that the scaled average power of the signal is processed over the communication channel at a prescribed operable power.

In accordance with another aspect of the present invention there is provided in an n-level quadrature amplitude modulation (QAM) communication system having a digital-to-analog converter and an n-QAM signal having an average transmitter power, for transmission on a communication channel, a method of adjusting the average transmitter power of the signal comprising the steps of: (a) defining a prescribed set of QAM index levels $n_i$; (b) selecting a reference QAM index from the prescribed set of QAM index levels where the composite signal is processed with a maximum average transmitter power supported by the communication system; (c) generating a power adjustment coefficient for each of the QAM index levels from the prescribed set of QAM index levels based on the reference QAM index level; and (d) adjusting the average transmitter power of the n-QAM signal with the corresponding power adjustment coefficient for the n-QAM signal to scale the average transmitter power to the prescribed maximum average transmitter power.

In accordance with another aspect of the present invention there is provided in a quadrature amplitude modulation (QAM) communication system comprised of a composite n-QAM signal, where n is a QAM index level, having an average power, for transmission on a communication channel supporting a prescribed maximum average power, an apparatus for adjusting the average power in said composite signal to a prescribed average power being less than the prescribed maximum average power, said apparatus comprising: (a) means for generating a power adjustment coefficient based on the QAM index level n; and (b) means for adjusting the average power of the composite n-QAM signal with the power adjustment coefficient to scale the average power to the prescribed average power.

In accordance with another aspect of the present invention there is provided in a quadrature amplitude modulation (QAM) communication system for transmitting an n-QAM signal, having an average power and an associated power adjustment coefficient, on a communication channel, where n is a QAM index level, a method of scaling the average power in said signal, said method comprising the steps of: (a) selecting the power adjustment coefficient associated with a QAM index level n; and (b) scaling the average power of the signal with the power adjustment coefficient, such that the adjusted average power of the signal is processed over the communication channel at a prescribed operable power.

In accordance with another aspect of the present invention there is provided in a quadrature amplitude modulation (QAM) communication system for transmitting an n-QAM signal, having an average power, on a communication channel, where n is a QAM index level, a method of generating a power adjustment coefficient for the n-QAM signal for adjusting the average power in said signal such that the signal is processed over the communication channel at a prescribed operable average power, said method comprising the steps of: (a) selecting a reference QAM index where the signal is processed over the communication channel at the prescribed operable power; and (b) calculating the power adjustment coefficient based on the prescribed operable power of step (a) and the average power of the n-QAM signal.

BRIEF DESCRIPTION OF THE DRAWINGS

The present invention will be described in conjunction with the drawings in which.

DETAILED DESCRIPTION OF EMBODIMENTS OF THE INVENTION

Figure 1:
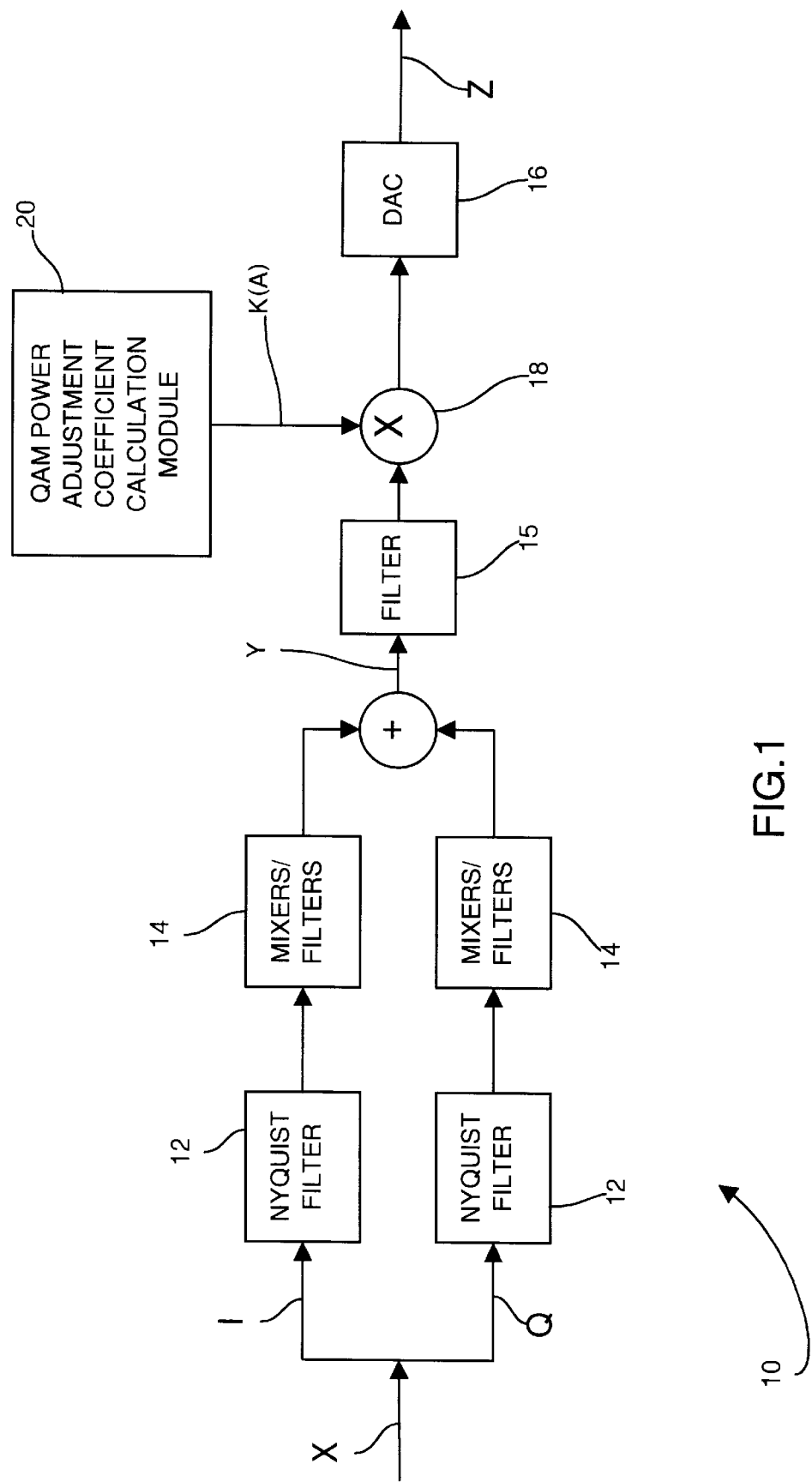
FIG. 1 illustrates a block diagram of a filtering and conversion section of a modem transmitter using QAM signalling incorporating signal power adjustment according to the present invention.

FIG. 1 illustrates a filtering and conversion section 10 of a modem transmitter. A complex input X=I+jQ in divided into a in-phase component (I) and a quadrature component (Q), with each component being filtered by a Nyquist filter 12 that uses known digital matched filtering principles. The output from filters 12 are each processed further by a mixers/filters module 14.

The mixing portion of module 14 bring the components (I and Q) of the QAM signal X to a desired frequency location for upstream or downstream transmission. The filtering portion of module 14 is used to reject images produced by interpolation as is well known in the art.

The I and Q output from the modules 14 are added together to form an output Y having a transmitter power $P_n$, which is different for each QAM index, where n represents the QAM index of the input signal X (e.g. n=4, 16, 64, or 256). The output signal Y is filtered by filter 15 to reduce noise that occurs in some transmission frequency bands that may interfere with a modem receiver.

In addition, the filter 15 is used to further interpolate the signal X before the DAC 16 to alleviate subsequent analog filtering requirements. Prior to processing the signal Y through a digital-to-analog converter 16 to produce an analog output signal Z, the transmitter power $P_n$ is adjusted by a programmable digital gain 18 based on a power adjustment coefficient K(A) supplied by a power adjustment coefficient calculation module 20.

The module 20 represents a set of registers (one register for each QAM index) that store the respective power adjustment coefficient K(A) since, in general, the coefficients K(A) are precomputed for the set of operating QAM indexes.

The power adjustment coefficient K(A) is unique to each QAM index. The power adjustment (by gain 18 using adjustment coefficient K(A)) enables the exact delivery of a prescribed operable transmitter power $P_{na}$ for the analog output signal Z for all QAM indexes (n) without exceeding power transmission standards, such as for ADSL based systems. The prescribed transmitter power $P_{na}$ can be established at or below the maximum average power supported by the system.

For example, in a 4 to 256-QAM system, since 256-QAM has the highest average power and the highest peak to RMS power ratio, the transmitter is designed to handle 256-QAM at its full scale fixed point dynamic range, and its power adjustment coefficient K(A) is set to one. The other QAM indexes (4,16, and 64) will produce average power and peak to RMS power ratios smaller than full scale (256-QAM). Therefore, the power adjustment coefficients K(A) for QAM indexes 4, 16, and 64 are larger than one.

The transmitter power $P_n$ is calculated using the following equation:

$$P_n = \frac{\sum X^2}{n} \qquad \text{Eq. 1}$$

where $P_n$ represents average transmitter power, X represents the complex-valued input signal, and n represents the operating QAM index level n.

The power adjustment coefficient for each QAM index level n is calculated using the following equation:

$$K(A) = \sqrt{\frac{P_{max}}{P_n}} \qquad \text{Eq. 2}$$

where K(A) represents the power adjustment coefficient, $P_{max}$ represents the prescribed maximum average transmitter power (i.e. full scale) for the highest QAM signal index used and $P_n$ represents the average power of the composite n-QAM signal.

The resulting adjusted average power is calculated using the following equation:

$$P_{na} = P_n \times K(A)^2 = P_{max} \qquad \text{Eq. 3}$$

where $P_{na}$ represents the adjusted average power level of the composite n-QAM signal.

An example set of power adjustment coefficients for a given set of QAM index levels are provided in Table A1. The power adjustment coefficients K(A) provided in Table A1 apply to any QAM communication system provided the appropriate constellation points are produced as listed in the quantized symbol co-ordinates mn of Table A1. The specific value of K(A) depends on the specific operating index.

TABLE A1

| QAM INDEX | QUANTIZED SYMBOL CO-ORDINATES | THEORETICAL TRANSMITTER POWER $P_n$ | POWER ADJUSTMENT COEFFICIENT K(A) |
|---|---|---|---|
| 4 | ±½ | ¼ | $\sqrt{\frac{85}{64}}$ |
| 16 | ±¼, ±¾ | 5/16 | $\sqrt{\frac{17}{16}}$ |
| 64 | ±⅛, ±⅜, ±⅝, ±⅞ | 21/64 | $\sqrt{\frac{85}{84}}$ |
| 256 | ±1/16, ±3/16, ... | 85/256 = $P_{max}$ | 1 (reference) |

The power adjustment coefficients K(A) ensure that all QAM index (n) signals Y are processed with maximum power using the full dynamic range of the transmitter 10. In the example of Table A, 256 QAM is designated as full scale with a maximum transmitter power of 85/256.

The power QAM index (e.g. n=4, 16, 64) signals Y are amplified by the digital gain 18 at the end of the transmit path before the digital-to-analog converter (DAC) 16 with the power adjust coefficients K(A) to achieve the same power level (i.e. $P_{max}$=85/256) as the highest QAM index signal.

Figure 2:
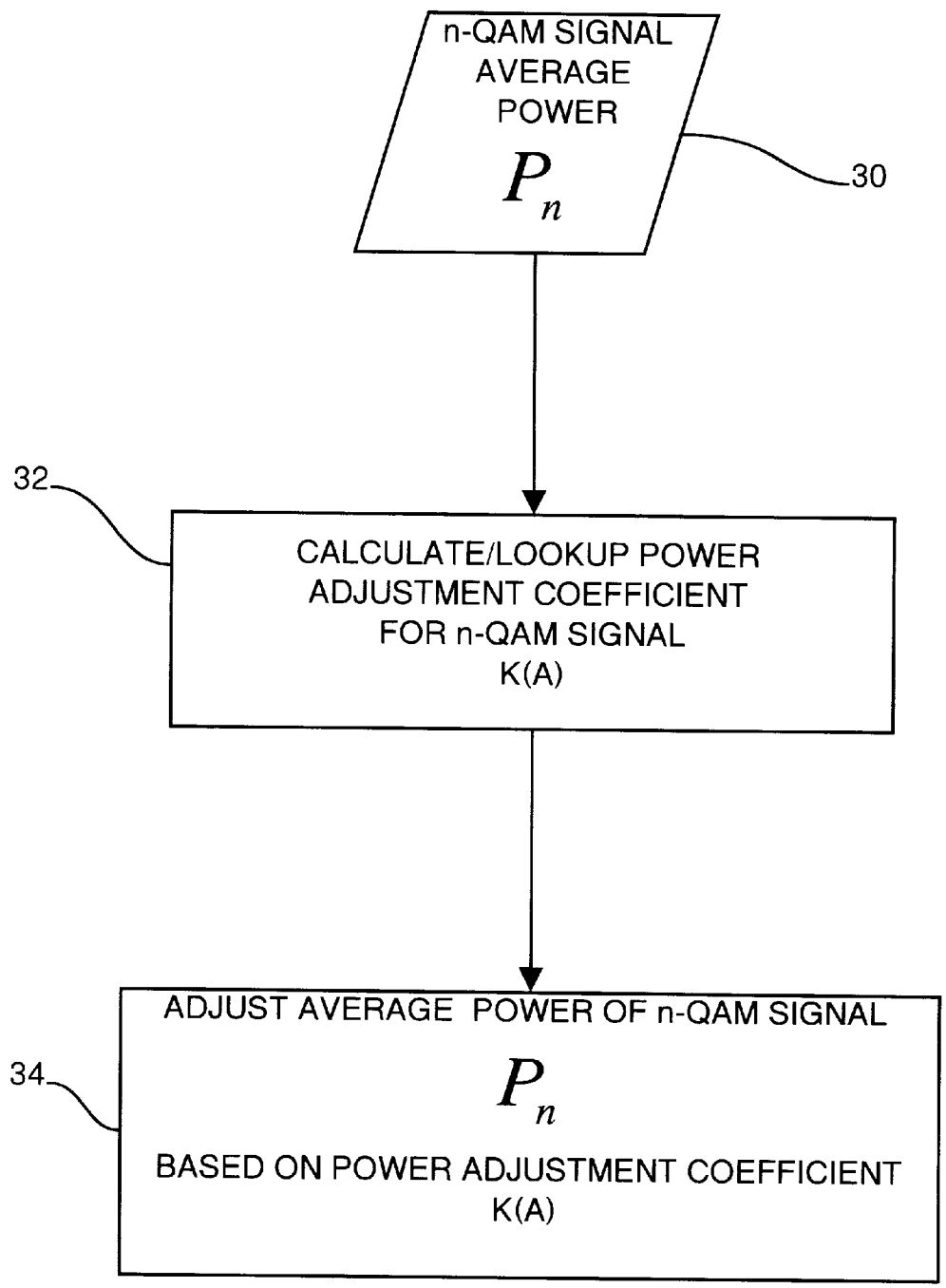
FIG. 2 illustrates a flow chart showing the method of signal power adjustment according to the present invention.

FIG. 2 illustrates a flow chart of the method of signal power adjustment according to the present invention. At step 30, the transmitter power $P_n$ of the signal Y at a prescribed QAM index n is provided as input to a power adjustment calculation step 32. The transmitter power $P_n$ can be measured directly, calculated using equation Eq.1 or referenced through a look-up table (such as Table A1) for the prescribed QAM index n.

At step 32, the power adjustment coefficient P(A) is either calculated using equation Eq. 2 or referenced through a look-up table or memory register (e.g. module 20), which includes information shown in Table A1, based on the prescribed QAM index n. The signal Y is scaled, at step 34, to produce the prescribed operable transmitter power $P_{na}$ by using the power adjustment coefficient K(A) determined at step 32 in equation Eq. 3 (where $P_{na} \leq P_{max}$).

Examples illustrating the signal power adjustment method of the present invention are provided below.

EXAMPLE 1
Input Signal (X): 4-QAM
Transmitter power at Y ($P_n$): $P_4$=¼
Power Adjustment Coefficient:

$$K(A) = \sqrt{\frac{85}{64}}$$

Adjusted transmitter power: $P_{na}=P_4 \times K(A)^2 = ¼ \times 85/64 = 85/256$ EXAMPLE 2
Input Signal (X): 16-QAM
Transmitter power at Y ($P_n$): $P_{16}$=5/16
Power Adjustment Coefficient:

$$K(A) = \sqrt{\frac{17}{16}}$$

Adjusted transmitter power: $P_{na}=P_{16} \times K(A)^2 = 5/16 \times 17/16 = 85/256$ EXAMPLE 3
Input Signal (X): 64-QAM
Transmitter power at Y ($P_n$): $P_{64}$=21/64
Power Adjustment Coefficient:

$$K(A) = \sqrt{\frac{85}{84}}$$

Adjusted transmitter power: $P_{na}=P_{64} \times K(A)^2 = 21/64 \times 85/84 = 85/256$ EXAMPLE 4
Input Signal (X): 256-QAM
Transmitter power at Y ($P_n$): $P_{256}$=85/256=$P_{max}$
Power Adjustment Coefficient: K(A)=1
Adjusted transmitter power: $P_{na}=P_{256} \times K(A)^2 = 85/256 \times 1 = 85/256$ As illustrated by the above examples, the adjusted transmitter power $P_{na}$ for the full range of QAM index input signals X are adjusted to produce the same power as the reference 256-QAM signal, in these examples $P_{na}$=85/256=$P_{max}$.

What is claimed is:

1. In a quadrature amplitude modulation (QAM) communication system comprised of a composite n-QAM signal, where n is a QAM index level, having an average power, for transmission on a communication channel supporting a prescribed maximum average power, a method of adjusting the average power in said composite signal to the prescribed maximum average power, said method comprising the steps of:
   (a) generating a power adjustment coefficient based on the QAM index level n; and
   (b) adjusting the average power of the composite n-QAM signal with the power adjustment coefficient to scale the average power to the prescribed maximum average power.

2. The method of claim 1, wherein step (a) includes the step of calculating the power adjustment coefficient based on the prescribed maximum average power and the average power of the composite n-QAM signal.

3. The method of claim 2, wherein the step of calculating is characterised by:

$$K(A) = \sqrt{\frac{P_{max}}{P_n}}$$

where K(A) represents the power adjustment coefficient, $P_{max}$ represents the prescribed maximum average power and $P_n$ represents the average power of the composite n-QAM signal.

4. The method of claim 3, wherein step (b) is characterised by:

$$P_{na}=P_n \times K(A)^2$$

where $P_{na}$ represents the adjusted average power level of the composite n-QAM signal.

5. In a quadrature amplitude modulation (QAM) communication system for transmitting an n-QAM signal, having an average power, on a communication channel, where n is a QAM index level, a method of scaling the average power in said signal, said method comprising the steps of:
   (a) generating a power adjustment coefficient associated based on the QAM index level n; and
   (b) scaling the average power of the signal with the power adjustment coefficient, such that the scaled average power of the signal is processed over the communication channel at a prescribed operable power.

6. The method of claim 5, further comprising defining a prescribed set of QAM index levels.

7. The method of claim 6, further comprising selecting a reference QAM index from the prescribed set of QAM index levels such that the prescribed operable power is a prescribed maximum average power of the communication channel.

8. The method of claim 7, wherein step(a) is repeated for each entry of the prescribed set of QAM index levels based on the reference QAM index level.

9. The method of claim 8, wherein the prescribed set of QAM index levels is {4, 16, 64, 256}.

10. The method of claim 9, wherein the QAM index level 256 is the reference QAM index.

11. The method of claim 10, wherein the power adjustment coefficient for QAM index level four is equal to the square root of the quotient of $P_{max}$ divided by $P_n$, where $P_{max}$ represents the prescribed maximum average power and $P_n$ represents the average power of the signal.

12. The method of claim 10, wherein the power adjustment coefficient for QAM index level 16 is equal to the square root of the quotient of $P_{max}$ divided by $P_n$, where $P_{max}$ represents the prescribed maximum average power and $P_n$ represents the average power of the signal.

13. The method of claim 10, wherein the power adjustment coefficient for QAM index level 64 is equal to the square root of the quotient of $P_{max}$ divided by $P_n$, where $P_{max}$ represents the prescribed maximum average power and $P_n$ represents the average power of the signal.

14. The method of claim 11, 12 or 13, wherein $P_{max}$ is equal to $^{85}/_{256}$.

15. The method of claim 5, wherein the step of adjusting is performed prior to converting the composite signal into an analog signal.

16. In an n-level quadrature amplitude modulation (QAM) communication system having a digital-to-analog converter and an n-QAM signal having an average transmitter power, for transmission on a communication channel, a method of adjusting the average transmitter power of the signal comprising the steps of:

(a) defining a prescribed set of QAM index levels $n_i$;

(b) selecting a reference QAM index from the prescribed set of QAM index levels where the composite signal is processed with a maximum average transmitter power supported by the communication system;

(c) generating a power adjustment coefficient for each of the QAM index levels from the prescribed set of QAM index levels based on the reference QAM index level; and (d) adjusting the average transmitter power of the n-QAM signal with the corresponding power adjustment coefficient for the n-QAM signal to scale the average transmitter power to the prescribed maximum average transmitter power.

17. The method of claim 16, wherein step(c) is characterised by:

$$K(A) = \sqrt{\frac{P_{max}}{P_n}}$$

where K(A) represents the power adjustment coefficient, $P_{max}$ represents the prescribed maximum average power and $P_n$ represents the average power of the composite n-QAM signal.

18. The method of claim 17, wherein step (b) is characterised by:

$$P_{na} = P_n \times K(A)^2$$

where $P_{na}$ represents the adjusted average power level of the composite n-QAM signal.

19. In a quadrature amplitude modulation (QAM) communication system comprised of a composite n-QAM signal, where n is a QAM index level, having an average power, for transmission on a communication channel supporting a prescribed maximum average power, an apparatus for adjusting the average power in said composite signal to a prescribed average power being less than the prescribed maximum average power, said apparatus comprising:

(a) means for generating a power adjustment coefficient based on the QAM index level n; and (b) means for adjusting the average power of the composite n-QAM signal with the power adjustment coefficient to scale the average power to the prescribed average power.

20. The apparatus of claim 19, wherein the means for generating includes an algorithm for calculating the power adjustment coefficient based on the prescribed average power and the average power of the composite n-QAM signal.

21. The apparatus of claim 20, wherein the algorithm includes means for calculating the power adjustment coefficient characterised by:

$$K(A) = \sqrt{\frac{P_{na}}{P_n}}$$

where K(A) represents the power adjustment coefficient, $P_{na}$ represents the prescribed average power and $P_n$, represents the average power of the composite n-QAM signal.

22. The apparatus of claim 21, wherein the means for adjusting includes a programmable digital gain for calculating the adjusted average power level by multiplying the average power of the composite n-QAM signal with the square of the power adjustment coefficient.

23. In a quadrature amplitude modulation (QAM) communication system for transmitting an n-QAM signal, having an average power and an associated power adjustment coefficient, on a communication channel, where n is a QAM index level, a method of scaling the average power in said signal, said method comprising the steps of:

(a) selecting the power adjustment coefficient associated with a QAM index level n; and (b) scaling the average power of the signal with the power adjustment coefficient, such that the adjusted average power of the signal is processed over the communication channel at a prescribed operable power.

24. In a quadrature amplitude modulation (QAM) communication system for transmitting an n-QAM signal, having an average power, on a communication channel, where n is a QAM index level, a method of generating a power adjustment coefficient for the n-QAM signal for adjusting the average power in said signal such that the signal is processed over the communication channel at a prescribed operable average power, said method comprising the steps of:

(a) selecting a reference QAM index where the signal is processed over the communication channel at the prescribed operable power; and (b) calculating the power adjustment coefficient based on the prescribed operable power of step (a) and the average power of the n-QAM signal.

25. The method of claim 24, wherein the prescribed operable power is a prescribed maximum average power supported by the communication channel.

26. The method of claim 25, wherein step (b) includes the step of obtaining the square root of the quotient of the prescribed maximum average power and the average power of the n-QAM signal.

* * * * *